United States Patent [19]

Malige

[11] Patent Number: 4,973,144
[45] Date of Patent: Nov. 27, 1990

[54] INERTIAL DEVICE FOR STABILIZING THE INCLINATION OF AN ORIENTABLE BODY AND VEHICLE-MOUNTED TELESCOPE MIRROR FITTED WITH A DEVICE OF THIS KIND

[75] Inventor: Jean Malige, Mougins, France

[73] Assignee: Aerospatiale Societe Nationale Industrielle, Paris, France

[21] Appl. No.: 286,751

[22] Filed: Dec. 19, 1988

[30] Foreign Application Priority Data

Dec. 17, 1987 [FR] France ................. 87 17642

[51] Int. Cl.⁵ .............. G02B 27/64; G02B 7/00; G02B 23/16; G01C 19/00
[52] U.S. Cl. .................. 350/500; 33/321
[58] Field of Search .............. 350/500; 33/318, 321, 33/323; 74/5.22, 5.34, 5.4

[56] References Cited

U.S. PATENT DOCUMENTS

| | | |
|---|---|---|
| 3,378,326 | 4/1968 | Alvarez . |
| 3,493,283 | 2/1970 | Higgins . |
| 3,499,332 | 3/1970 | Fingerett et al. . |
| 3,951,510 | 4/1976 | Lloyd ................. 350/500 |
| 4,105,281 | 8/1978 | Johnson et al. .......... 350/500 |
| 4,155,621 | 5/1979 | Mead . |
| 4,576,449 | 3/1986 | Ruger . |

FOREIGN PATENT DOCUMENTS

| | | |
|---|---|---|
| 1548371 | 6/1971 | Fed. Rep. of Germany . |
| 1547241 | 9/1971 | Fed. Rep. of Germany . |
| 2607679 | 7/1976 | Fed. Rep. of Germany . |
| 475569 | 10/1968 | France . |
| 2560677 | 3/1984 | France ................. 350/500 |
| 2552893 | 7/1986 | France . |
| 783587 | 11/1980 | U.S.S.R. . |

*Primary Examiner*—Jon W. Henry
*Attorney, Agent, or Firm*—Browdy and Neimark

[57] ABSTRACT

A device for stabilizing the inclination of an orientable member mobile in rotation relative to a support which is itself mobile. The device includes, the member, a gyroscope the input shaft of which is rotated on itself by an aiming motor having a casing fastened to a cradle coupled in rotation relative to the support by a transmission linkage determining a constant ratio between the relative rotation of the member and the casing relative to the support. The gyroscope includes a precession detector connected to the inclination motor by an automatic control circuit capable of applying at any time to the motor a signal adapted to compensate the precession induced by angular disturbance of the support about the inclination axis.

13 Claims, 7 Drawing Sheets

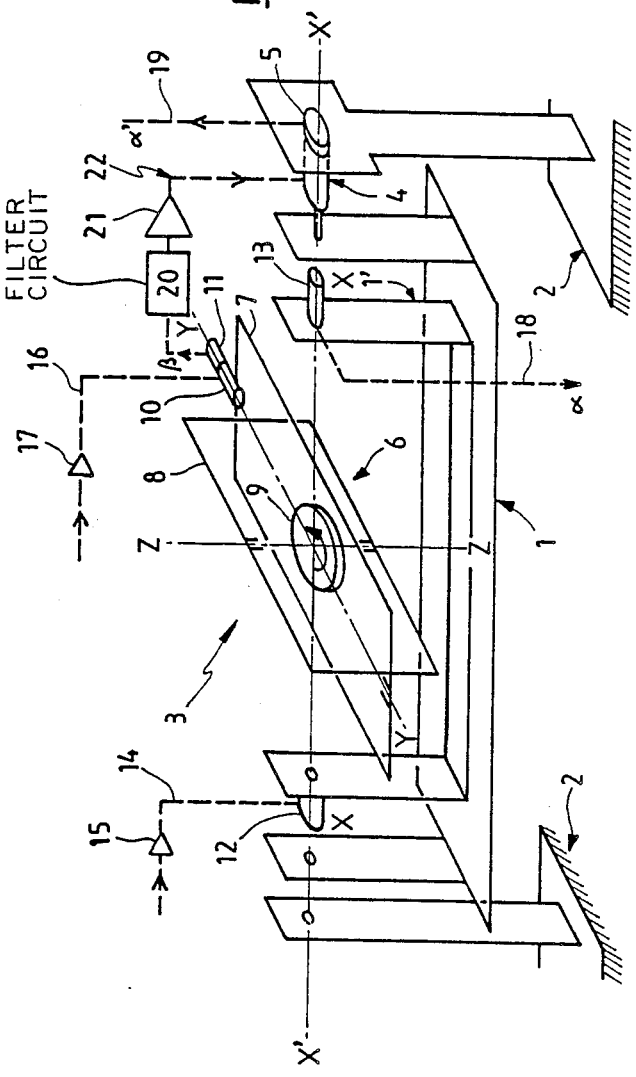
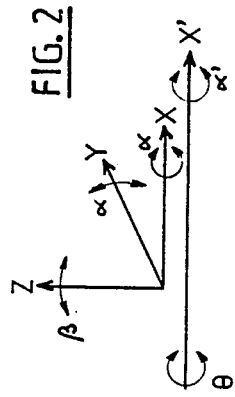

INERTIAL DEVICE FOR STABILIZING THE INCLINATION OF AN ORIENTABLE BODY AND VEHICLE-MOUNTED TELESCOPE MIRROR FITTED WITH A DEVICE OF THIS KIND

BACKGROUND OF THE INVENTION

1. Field of the Invention

The invention concerns a device for stabilising the inclination, relative to an external frame of reference, of a body mobile in rotation about at least one rotation axis relative to a support, the inclination of which relative to said external frame of reference fluctuates. It is more particularly, although not exclusively, concerned with stabilising an optical element mounted on board a vehicle, for example an aircraft (or a balloon, a space vehicle, etc) relative to which the optical instrument can rotate about two perpendicular rotation axes.

2. The Prior Art

The present invention concerns, for example, the input mirror of an observation telescope mounted on board an aircraft. As is well known, the function of this mirror is to reflect incident radiation along the input axis of the telescope, which axis is fixed relative to the aircraft (usually the axis of the telescope is parallel to the longitudinal axis and to the path of movement of the aircraft whereas the incident radiation is approximately transverse thereto). This mirror can be oriented about two orthogonal axes respectively perpendicular and parallel to the axis of the telescope. The problem is then to control the inclination of the mirror relative to the aircraft as accurately as possible so as to maintain the alignment of the reflected radiation with the axis of the telescope in spite of vibration of the aircraft and variations in its orientation in space.

Various stabilisation devices for one or two axes have already been proposed to meet this objective as closely as possible; some of them, for example, are described in documents FR-2.552.893, U.S. Pat. Nos. 3.378.326, 3.493.283, 4.155.621 and 4.576.449. More generally speaking, there is also known from the document U.S. Pat. No. 3.499.332 or the document SU-783.587 a device for stabilising an inertial platform. All these systems employ gyroscopes or inertia wheels.

There is a particular problem to be overcome in achieving control relative to two axes because the variations in the inclination of the aircraft relative to a transverse axis perpendicular to the input axis of the telescope requires a correction to the mirror angle in a ratio of $\frac{1}{2}$ whereas in the event of variation in the inclination relative to the longitudinal axis the angle correction has to be performed with a unity ratio.

Also, the observation of mobile targets often makes it essential to be able to aim an input mirror of this kind at high speed.

Problems of the same kind are associated with the use of other optical instruments, for example the orientable reflector of a laser mounted on board a vehicle, usually an aircraft or space vehicle.

The stabilisation devices known at this time do not enable highly accurate stabilisation (to within one minute of angular arc or even less) in combination with aiming at high speed (for example at rates up to 200°/s) if an inertial reference system is employed.

Thus devices using a stabilised platform are not suited in practice to angle correction with the aforementioned $\frac{1}{2}$ ratio.

Devices incorporating gyroscopes linked to the instrument to be stabilised do not allow high aiming speeds since this requires a high degree of precession to be imposed on the gyroscope, which compromises their accuracy. Since for aiming about a transverse axis the precession has to be in a ratio of $\frac{1}{2}$ to the aiming angle, additional error results.

It must be borne in mind that precession is a motion resulting from an external torque which is perpendicular to the plane defined by the spin axis and the axis of the disturbing torque.

Generally speaking, the known solutions are concerned with small aiming devices with no automatic control system.

SUMMARY OF THE INVENTION

An object of the invention is a device meeting both the above objectives simultaneously with regard to at least one pivoting axis allowing aiming at high speed without rapid precession of the gyroscope or gyroscopes that it incorporates.

The invention therefore proposes a device for stabilising the inclination relative to an external frame of reference of an orientable member rotatable by an inclination motor about at least one inclination axis relative to a support mobile relative to the external frame of reference characterised in that it comprises, carried by the orientable member, a gyroscope module having an input shaft at an angle less than 90° to the inclination axis and a rotor axis perpendicular to a precession axis perpendicular to the input shaft which is at a non-zero angle to the inclination axis. The input shaft is secured axially and laterally relative to the orientable member and rotated on itself by an aiming motor receiving aiming signals and the casing of which is fastened to a cradle rotated relative to the support parallel to the inclination axis by means of a transmission linkage determining a constant ratio K between relative rotation of the orientable member and the casing relative to said support. The gyroscope module further comprises a precession detector connected to the inclination motor through an automatic control circuit adapted to apply to the inclination motor at any time a command signal adapted to compensate instantaneous precession detected by said detector.

According to preferred embodiments of the invention:

- the input shaft is approximately parallel to the inclination axis; in practice the angle between the input shaft and the inclination axis is less than 15°;
- the rotor axis is substantially perpendicular to the inclination axis; in practice the rotor axis is at an angle between 85° and 95° to the inclination axis;
- the casing of the aiming motor is fastened to the orientable member, the transmission ratio K having the value K=1;
- the transmission linkage comprises a pair of toothed wheels meshing with each other and having the same number of teeth respectively carried by the support and the input shaft, the transmission ratio having the value K=$\frac{1}{2}$.

The novelty of this invention lies in the fact that the gyroscope is used as a zero instrument in an automatic control loop allowing a high rotation speed for orienting the optical instrument. This speed may be several hundreds of degrees per second.

This result is achieved without having the gyroscope precess.

The fact that the gyroscope is used as a zero instrument makes it possible to minimise a number of errors or drifts. For example, the gyroscope retains the same position relative to gravity and is therefore not disturbed, as in the case of a tied gyroscope.

Independently of this it is therefore possible to have the gyroscope precess at very low speed to make angular corrections, especially in either of the following cases:

recalibration of the reference before a mission, or during a mission if an external reference is available;

cancellation of terrestrial rotation (the components of terrestrial rotation vary according to the direction and the latitude from 0° through 15°/hour);

following the local vertical (a speed of one knot corresponds to a rotation of one minute of arc/hour).

The invention also proposes a device for stabilising an optical instrument that can be oriented about two orthogonal rotation axes comprising two elementary devices of the aforementioned type one of which is coupled directly to the optical instrument (to control fluctuations of the support about an axis parallel to the axis of the associated onboard equipment) and the other of which is coupled to the instrument through a linkage with a ratio of ½ (an epicyclic gear system, for example).

The invention also proposes a vehicle-mounted telescope mirror equipped with a stabilising device of this kind.

BRIEF DESCRIPTION OF THE INVENTION

Objects, characteristics and advantages of the invention will emerge from the following description given by way of non-limiting illustrative example only with reference to the appended drawings in which:

FIG. 1 is a schematic view in perspective of a one-axis stabilisation device in accordance with the invention;

FIG. 2 is a simplified representation of the device limited to the rotation axes operative in the device;

DETAILED DESCRIPTION OF THE PREFERRED EMBODIMENTS

Figure 3:
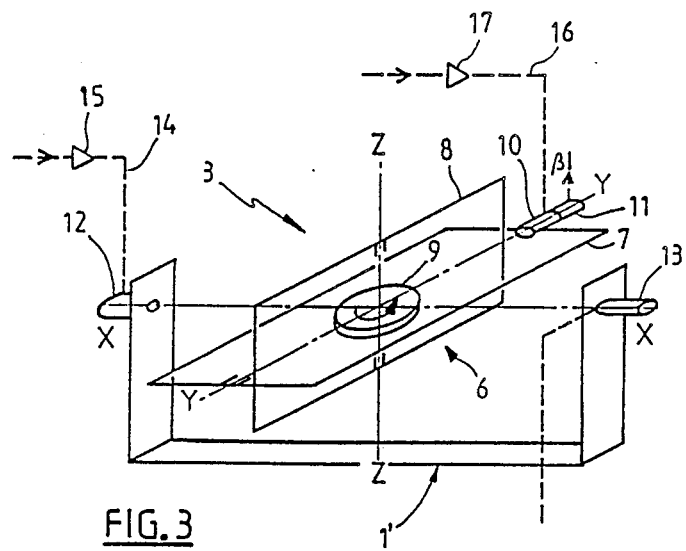
FIG. 3 is a schematic view in perspective of a gyroscope module shown in isolation.

FIG. 1 shows in a schematic way an orientable member 1 mobile in rotation about an inclination axis X'—X' relative to a support 2 the orientation of which, about the axis X'—X' relative to an external frame of reference, fluctuates; FIG. 1 also shows a device 3 for stabilising the orientable member 1 relative to its support 2.

An inclination motor 4 is associated with the orientable member 1 to command its inclination relative to the support 2 about the axis X'—X'. An encoder 5 is associated with this motor to indicate, where necessary, the instantaneous angular position $\alpha'$ of the orientable member 1 relative to the support 2.

The stabilisation device 3 (referred to hereinafter as the "gyroscope module") is shown in isolation in FIG. 3. It essentially comprises a gyroscope 6 including a casing 7 which is here schematically represented by an external frame, an internal frame 8, a rotor 9, a torque motor 10 and a detector 11.

The outer frame or casing 7 is coupled to a cradle 1' fastened to the orientable member 1 by an input shaft on an axis X—X called the sensitive axis of the device 3.

The inner frame 8 is mounted to pivot on the outer frame 7 about an axis Y—Y perpendicular to the axis X—X and called the output axis or precession axis. The inner frame 8 is rotated relative to the outer frame 7 by the torque motor 10; the detector 11 indicates the instantaneous relative position ($\beta$) of the frames 7 and 8.

The rotor 9 is rotated at high speed by conventional means (not shown) about an axis Z—Z perpendicular to the output axis Y—Y and called the rotor axis, materially represented by a shaft inserted in bearings coupled to the inner frame. This axis tends to constitute an inertial reference axis.

In the FIG. 1 configuration the mean position of the rotor axis Z—Z is substantially perpendicular to the sensitive axis X—X which is coincident with the axis X'—X'.

As an alternative to this the axes X—X and X'—X' may be parallel and not coincident. They may even be non-parallel provided that the angle between them is less than 90° (preferably less than 45° and even better less than 15°) and that the inclination axis is not parallel to the rotor axis (being at an angle preferably between about 85° and 95° to the latter).

Within the gyroscope module 3 the outer frame 7 and therefore the gyroscope 6 as a whole are rotated relative to the orientable member 1 about the axis X—X by a motor 12 called the aiming motor with which is associated an angular encoder 13 adapted to indicate the instantaneous angular position ($\alpha$) of the gyroscope 6 relative to the orientable member 1. The aiming motor 12 has a casing which is in this instance fastened to the cradle 1' of the orientable member 1.

It should be borne in mind that, as is well known, any torque applied to the outer frame about the sensitive axis X—X relative to a frame of reference fixed in space causes, in accordance with the theory of kinetic momentum, an inclination (precession) of the rotor axis Z—Z about the output axis Y—Y also known as the precession axis. This precession can also be brought about directly by the torque motor 10.

The gyroscope module 3 further comprises lines connecting it to external units.

Thus the aiming motor 12 receives set point signals over a line 14 equipped in practice with an amplifier 15. Similarly, the torque motor 10 receives alignment signals over a line 16 likewise equipped with an amplifier 17. The angular encoder 13 transmits the magnitude $\alpha$ over a line 18.

The encoder 5 transmits the angle $\alpha'$ over a line 19.

The detector 11 transmits the magnitude $\beta$ to a processing and filter circuit 20 which generates an automatic control signal which is applied to the motor 4 after amplification at 21. This constitutes an automatic control loop 22 for the member 1 that is orientable relative to the support 2.

The gyroscope module 3 and the aforementioned lines provide various possibilities for automatic control of the orientable member.

In automatic control mode, if the support is subject to a variation $\ominus$ in its orientation in space about an axis parallel to X'—X' this variation is transmitted first to the orientable member 1 which induces via the cradle 1' a torque about the input axis X—X of the gyroscope module 3. This results in a precession $\beta$ of the gyroscope which is detected by the detector 11. The circuit 20 of the automatic control loop 22 consequently generates a signal for the motor 4 which causes a rotation $\alpha'$ of the orientable member relative to the support equal but opposite to the disturbance $\ominus$. This produces a correcting torque on the gyroscope which undergoes a precession which returns the axix Z—Z to its original orientation in space.

If the inclination axis X'—X' is at a non-zero angle to the input shaft, any angular disturbance about the inclination axis can be broken down into a component of rotation parallel to the rotor axis which does not cause any reaction by the gyroscope module and a component of rotation about the input shaft which is compensated by precession as described hereinabove.

The torque motor 10 is activated if, before starting a working phase, it is necessary to adjust the position of the rotor axis in space.

If the orientable member 1 is to be moved rapidly relative to its support 2 a set point signal is applied to the aiming motor 12. As soon as the latter begins to apply torque to the gyroscope 6, and in the same way as previously, the automatic control loop 22 brings about relative rotation between the orientable member and the support which tends to compensate the induced precession of the rotor 9. The result is that the inclination of the orientable member 1 relative to the support changes without inducing any precession of the gyroscope: this change of inclination can therefore be performed at high speed and with great accuracy.

FIGS. 4 through 9 show a particularly advantageous application of the gyroscope module 3 from FIG. 1. The aim is to stabilise about two axes the input mirror 30 of an onboard telescope (in practice mounted in the nose of an aircraft) represented only by its input axis V—V. In practice this input axis is parallel to the longitudinal axis or the thrust axis of the aircraft on which it is mounted.

The mirror 30 is articulated about an axis U—U transverse to V—V on a yoke 31 in turn articulated about an axis W—W parallel to the axis V—V (in practice coincident with the latter) on a support structure 32 fastened to the aircraft.

This mirror has a mean orientation relative to the axes V—V and W—W of 45° so that it can reflect along the axis V—V incident radiation R transverse to the axis of the aircraft. It is elliptical so as to present a disk-shaped surface to this radiation. In practice it is moved approximately 10° either side of this mean value of 45° by a motor 33 and at least 90° and possibly more than 180° about the axis W—W by a motor 34.

Figure 4:
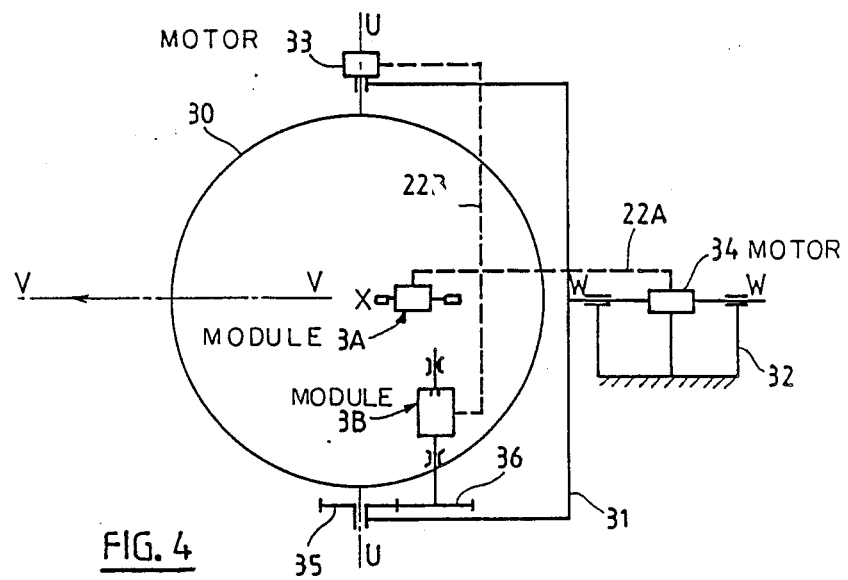
FIG. 4 is a view in elevation as seen in the direction opposite to the incident radiation of an onboard mirror with two axes equipped with a two-axis stabilisation device in accordance with the invention.
Figure 5:
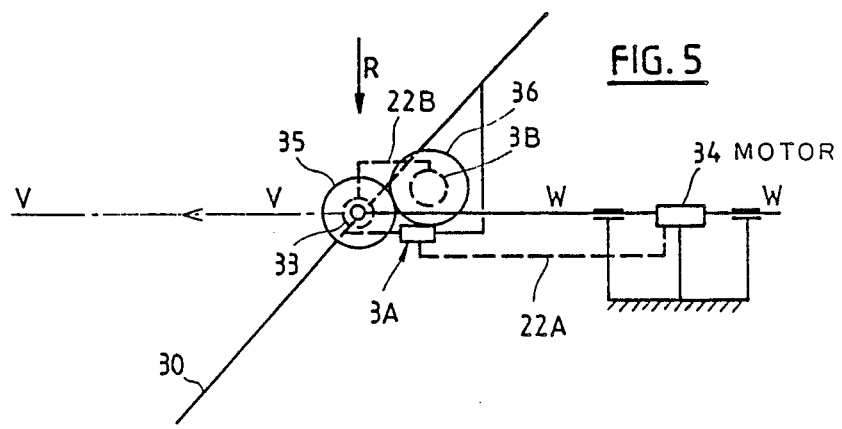
FIG. 5 is a plan view of the device.
Figure 6:
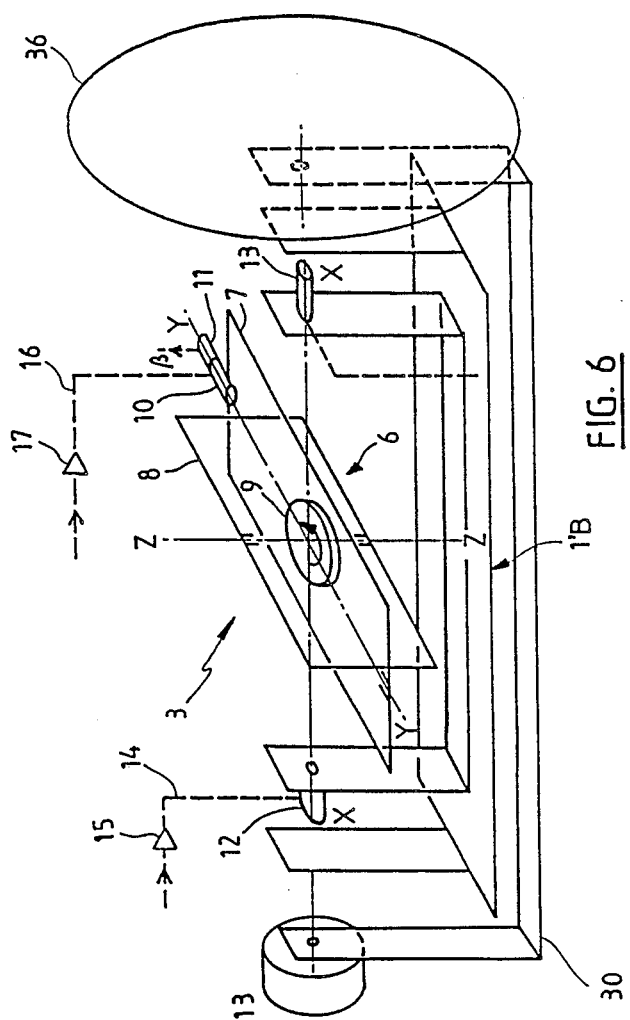
FIG. 6 is a schematic view in perspective of a gyroscope module mounted to rotate about its input shaft on an orientable member.

Thus as seen from FIGS. 4 and 5 there is associated with each axis U—U and W—W a gyroscope module of the type described hereinabove. One of these, denoted 3A, is associated with the axis W—W and the other, denoted 3B, is associated with the axis U—U. These gyroscope modules conjointly constitute a device for stabilising the mirror 30 relative to an external frame of reference.

The gyroscope module 3A is carried directly by the mirror 30, which is to say that its cradle 1'A (see FIG. 7) is fastened to the mirror itself. The input axis of its gyroscope 6A is substantially parallel to the axis W—W (to within the angular displacement of the mirror relative to the yoke—in practice 10°).

The stabilisation device 3B is carried indirectly by the mirror, however, and its input axis is parallel to U—U. Its cradle 1'B (see FIG. 8) is coupled to the mirror by a mechanical linkage such that the cradle turns about an axis parallel to U—U twice as fast as the mirror itself.

In the example shown (FIGS. 4 through 6 and 8) this linkage is provided by a pair of toothed wheels 35 and 36 which have the same number of teeth. The toothed wheel 35 is fastened to one branch of the yoke 31 and coaxial with U—U whereas the other toothed wheel 36 is fastened to the cradle 1'B (in this instance a casing) rotatably mounted on the mirror by bearings 37.

The gyroscope modules 3A and 3B are placed as close as possible to the centre of gravity of the mirror.

Figure 7:
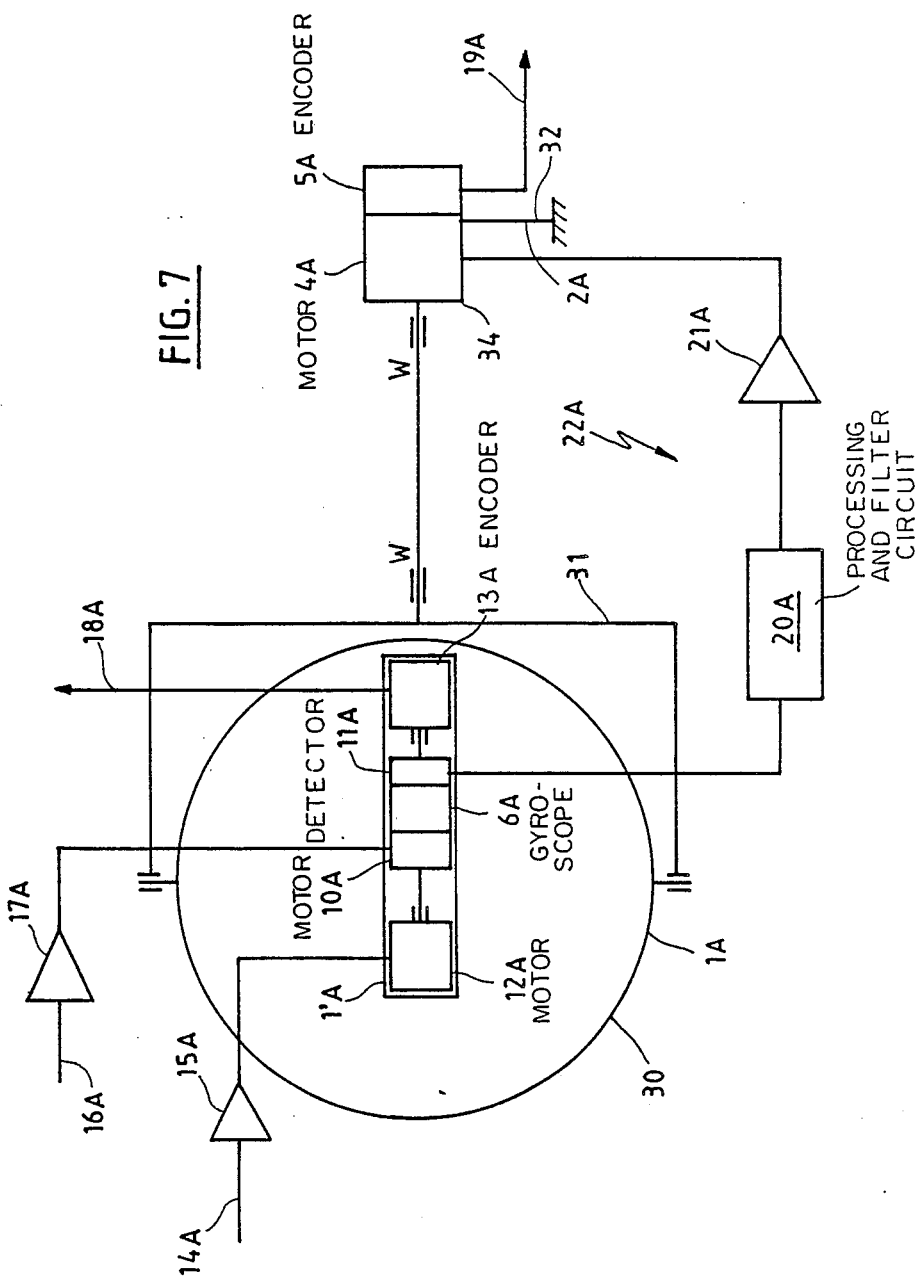
FIG. 7 is a partial schematic view of the device from FIG. 4, showing the details of a first automatic control loop.
Figure 8:
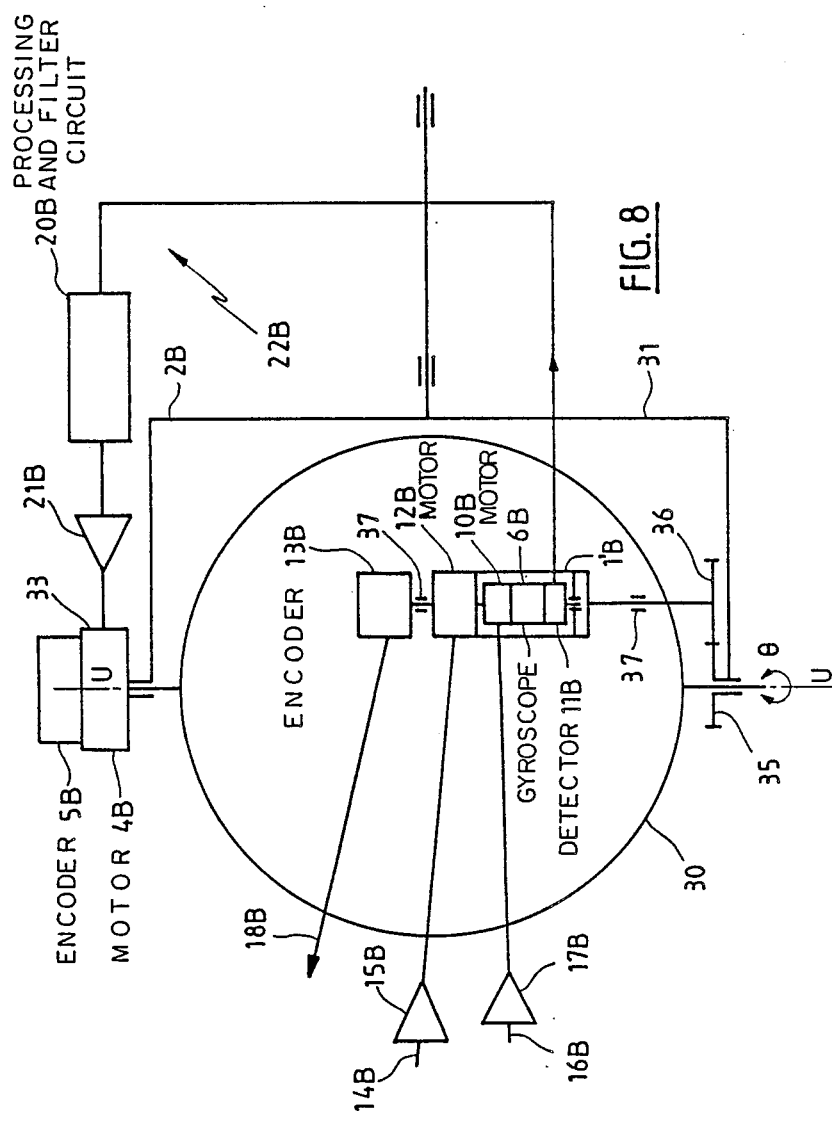
FIG. 8 is an analogous schematic view showing the details of a second automatic control loop complementing that of FIG. 7.

Each of the gyroscope modules is connected to the corresponding motor 33 or 34 by lines forming automatic control loops 22A or 22B shown in detail in FIGS. 7 and 8.

To show up the analogy between these figures and FIG. 1, the component parts in these figures corresponding to those in FIG. 1 have the same reference number followed by the letter A or B, respectively, although some parts have a double reference.

The coupling between the supports 2A and 2B and the associated cradles 1'A and 1'B is not so direct as in FIG. 1 but the principle is the same.

Referring to FIG. 8 regarding the second automatic control loop 22B and the gyroscope module 3B it is seen that an angular disturbance $\ominus$ to the aircraft and therefore to the yoke and also to the telescope itself about an axis parallel to the axis U—U is reflected at the gyroscope 6B. There results through the automatic control loop 22B compensating rotation of the mirror relative to the yoke 31 which is equal to one half the disturbance $\ominus$. This realigns the reflected radiation with the axis of the telescope while compensating totally for the precession resulting from the disturbance.

Figure 9:
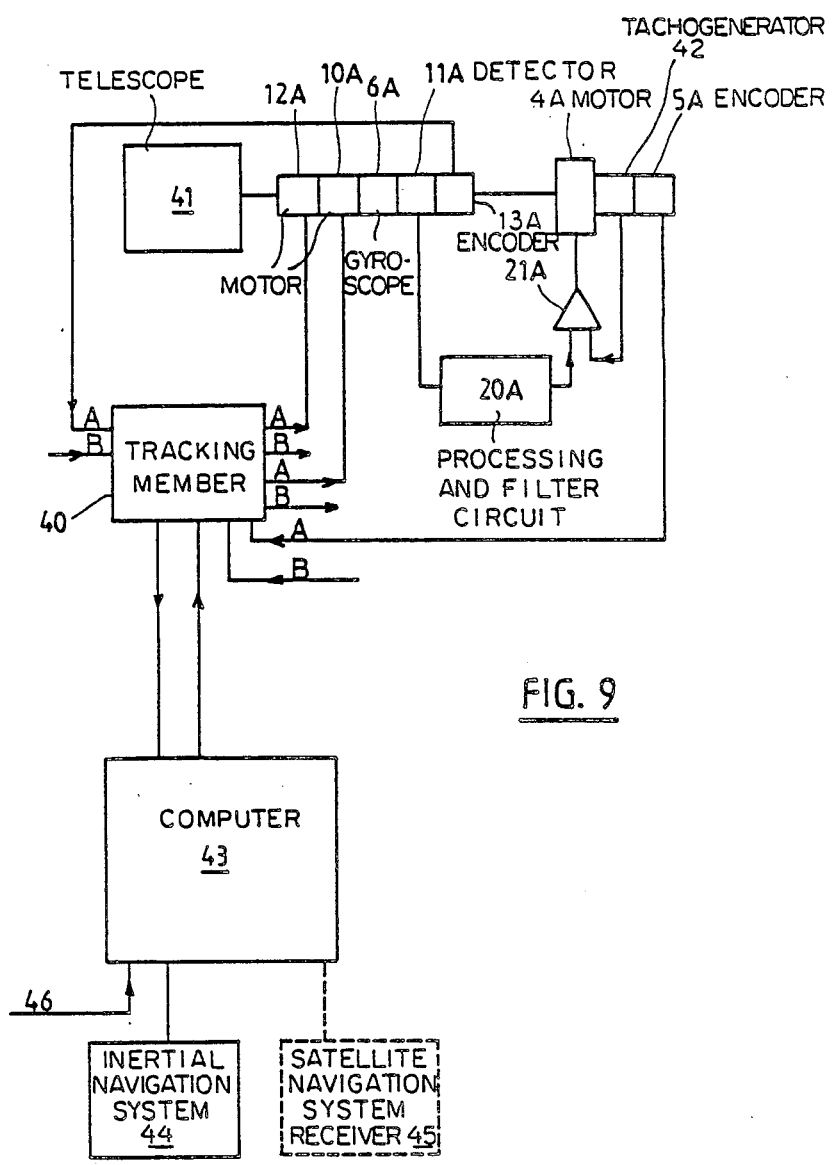
FIG. 9 is a partial electrical schematic associated with the device from FIG. 4, only one of the automatic control loops being explicitly shown.

FIG. 9 is a general block diagram of the control circuit for the stabilisation device in which only channel A is shown (corresponding to the components from FIG. 7), channel B being merely sketched in for reasons of visibility but being in all respects similar to channel A.

The circuit comprises a control, pre-aiming and tracking member 40 in practice constituted by a microprocessor which transmits to the gyroscope modules 3A and 3B the instructions necessary for correct orientation of the mirror relative to the axis of the telescope 41 and receives from it in return the measurement signals. Note the inclusion of a tachogenerator 42 the speed signal from which is used at 21A to stabilise the automatic control loop.

The control unit 40 is in turn controlled by a navigation and telescope control computer 43. This computer receives various information, in particular from an inertial navigation system 44 and where necessary from a satellite navigation system (NAVSTAR type) receiver 45. It also receives external information 46.

A mirror stabilising system 3A-3B of this kind has the following advantages and special features:

the controlled member (the mirror) itself carries the member responsive to movement of the aircraft (the gyroscope module) which serves as an error detector for an analogue power loop (this responsive member being fixed directly or indirectly to the controlled member); movements of the aircraft are therefore not processed by the microprocessor which can therefore have a much lower computing frequency; the characteristics of the resulting analogue loop depend on the response of the aircraft to external loads;

the system is not disturbed by any deformation of the aircraft;

the system enables angular displacements of high amplitude at great speed (approximately 200°/s);

the gyroscopes represent the inertial reference;

there is provision for fine adjustment of the inertial reference according to the position of the aircraft itself during aiming;

the use of a microprocessor enables control and monitoring of the system through a purely digital interface with the navigation computer;

the redundancy of the angle measurements confers great security of operation and makes it possible to detect malfunctions quickly;

the system is independent of the piloting of the aircraft, which renders the mission more secure;

the system may be very highly integrated prior to interconnection with the mission computer;

the solution employs virtually trouble-free classic measures;

the gyroscope modules constitute an integrated unit that may be supplied by a single subcontractor;

the inertial reference is represented in the gyroscope modules so that a horizon-referenced monitoring system, for example, may be used;

the elements for adjusting the system are very precisely localised in the structure filters and in the gains of the electronics of the power loop and in the microprocessor software. A very significant part of the system definition will be acquired very quickly and will not be subject to further variation after tests.

It goes without saying that the foregoing description has been given by way of non-limiting example only and that numerous variations may be put forward by those skilled in the art without departing from the scope of the invention. As an example, in the place of the teeth of the wheels 35 and 36, there may be used any other means adapted to allow these adjacent wheels of equal diameters to roll on each other without sliding; as a possible example, there may be used a belt wound along both edges of these wheels so as to take a "8" shape.

I claim:

1. A stabilization device for stabilizing the inclination relative to an external frame of reference of an orientable member rotatable by an inclination motor about at least one inclination axis relative to a support mobile relative to the external frame of reference, said device comprising for each of said at least one inclination axis:

at least one gyroscope module carried by the orientable member having an input shaft at an angle less than 90° to the inclination axis and a rotor axis substantially perpendicular to a precession axis perpendicular to the input shaft which is at a non-zero angle with respect to the inclination axis, the input shaft being secured axially and laterally relative to the orientable member, and a single aiming motor for rotating the input shaft responsive to received aiming signals and having a casing fastened to a cradle rotated relative to the support parallel to the inclination axis by means of a transmission linkage determining a constant transmission ratio K between relative rotation of the orientable member and the casing relative to said support, the gyroscope module further comprising a precession detector for detecting precession connected to the inclination motor, an automatic control circuit connected to the precession detector and the inclination motor for applying a command signal to the inclination motor at any time to compensate instantaneous precession detected by said detector.

2. The stabilization device according to claim 1, wherein the input shaft is approximately parallel to the inclination axis.

3. The stabilization device according to claim 1, the rotor axis is substantially perpendicular to the inclination axis.

4. The stabilization device according to claim 1, wherein the casing of the aiming motor is fastened to the orientable member, the transmission ratio taking the value $K=1$.

5. The stabilization device according to claim 1, wherein the orientable member to be stabilized is an orientable mirror and wherein said transmission linkage between the cradle of the gyroscope module and the orientable mirror is constituted by a pair of toothed wheels meshing with each other and having the same number of teeth respectively carried by the support and the input shaft, the transmission ratio taking the value $K=\frac{1}{2}$.

6. The stabilization device according to claim 1, the orientable member is rotatable relative to the support by first and second inclination motors about orthogonal first and second inclination axes and wherein said at least one gyroscope modules comprise first and second gyroscope modules associated with the first and second inclination axes, both modules carried by the orientable member in such a way as to have input shafts orthogonal to one another and both equipped with first and second aiming motors having casings fastened to cradles rotated relative to the support parallel to the associated inclination axes by transmission linkages determining first and second constant transmission ratios K and both incorporating a precision detector connected to the associated inclination motor through first and second automatic control circuits.

7. The stabilization device according to claim 6, wherein the orientable member is a reflector associated with onboard equipment on the support and having an axis fixed relative to the latter and the reflector is mounted to be rotated about a transverse axis forming the second inclination axis by the second inclination motor on a yoke mounted to be rotated on the support about an axis parallel to the axis of the equipment and forming the first inclination axis by the first inclination motor and the first cradle is fastened to the reflector determining a unity transmission ratio K and the second cradle is fastened to a first toothed wheel meshing with a second toothed wheel having the same number of teeth and fastened to the yoke determining the second transmission ration K equal to $\frac{1}{2}$.

8. The stabilization device according to claim 7, wherein the input shaft of the first gyroscope module is approximately parallel to the first inclination axis and the input shaft of the second gyroscope module is parallel to the second inclination axis.

9. A vehicle-mounted telescope mirror fitted with the stabilization device according to claim 1.

10. The stabilization device according to claim 1, wherein said gyroscope module further includes a torque motor for rotation about said precession axis and receiving alignment signals.

11. The stabilization device according to claim 1, wherein said gyroscope module further comprises an angular encoder measuring an instantaneous angular position of said input shaft relative to the orientable member.

12. The stabilization according to claim 2, wherein the input shaft is less than 15° angularly offset with respect to the inclination axis.

13. A vehicle-mounted telescope mirror fitted with the stabilization device according to claim 6.

* * * * *